United States Patent
Naito et al.

(10) Patent No.: US 12,494,501 B2
(45) Date of Patent: Dec. 9, 2025

(54) STACK CASE AND METHOD OF ASSEMBLING STACK CASE

(71) Applicant: HONDA MOTOR CO., LTD., Tokyo (JP)

(72) Inventors: Hideharu Naito, Wako (JP); Hideo Aizawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 780 days.

(21) Appl. No.: 17/678,372

(22) Filed: Feb. 23, 2022

(65) Prior Publication Data

US 2022/0293994 A1 Sep. 15, 2022

(30) Foreign Application Priority Data

Mar. 15, 2021 (JP) .................................. 2021-041219

(51) Int. Cl.
*H01M 8/2475* (2016.01)
*H01M 8/0247* (2016.01)
*H01M 8/04537* (2016.01)
*H01M 8/2404* (2016.01)

(52) U.S. Cl.
CPC ....... *H01M 8/2475* (2013.01); *H01M 8/0247* (2013.01); *H01M 8/04559* (2013.01); *H01M 8/2404* (2016.02); *H01M 2250/20* (2013.01)

(58) Field of Classification Search
None
See application file for complete search history.

(56) References Cited

U.S. PATENT DOCUMENTS

| 2008/0280188 | A1* | 11/2008 | Eun ................... | H01M 8/04171 429/414 |
| 2009/0325006 | A1* | 12/2009 | Yagi .................... | H01M 8/1011 429/431 |
| 2012/0021271 | A1* | 1/2012 | Tople .................. | H01M 10/613 429/120 |
| 2017/0054165 | A1* | 2/2017 | Coz ..................... | H01M 4/8605 |
| 2020/0067108 | A1* | 2/2020 | Yoshitomi .......... | H01M 8/0273 |

FOREIGN PATENT DOCUMENTS

JP 2020-029190 A 2/2020

OTHER PUBLICATIONS

Tech Briefs, Alignment Pins for Assembling and Disassembling Structures, Sep. 1, 2008, Tech Briefs Engineering Solutions for Design & Manufacturing (Year: 2008).*
Boegger, Single/Multiple Layer of Sintered Mesh Laminate, Sep. 12, 2018 (Year: 2018).*

* cited by examiner

*Primary Examiner* — Ula C Ruddock
*Assistant Examiner* — Mary Grace Byram
(74) *Attorney, Agent, or Firm* — Carrier, Shende & Associates P.C.; Joseph P. Carrier; Fulchand P. Shende

(57) ABSTRACT

The stack case includes a main body with a rectangular opening and a lid member covering the opening. A single positioning pin and a protrusion protrude outward of the main body from an edge in the opening of the side portion. The positioning pin inserted into the insertion hole of the lid member supports the lid member rotatably about the axis of the positioning pin. In a state where the positioning pin is inserted into the insertion hole, the placement surface of the lid member is placed on the positioning surface of the protrusion, whereby the lid member is positioned with respect to the opening.

5 Claims, 5 Drawing Sheets

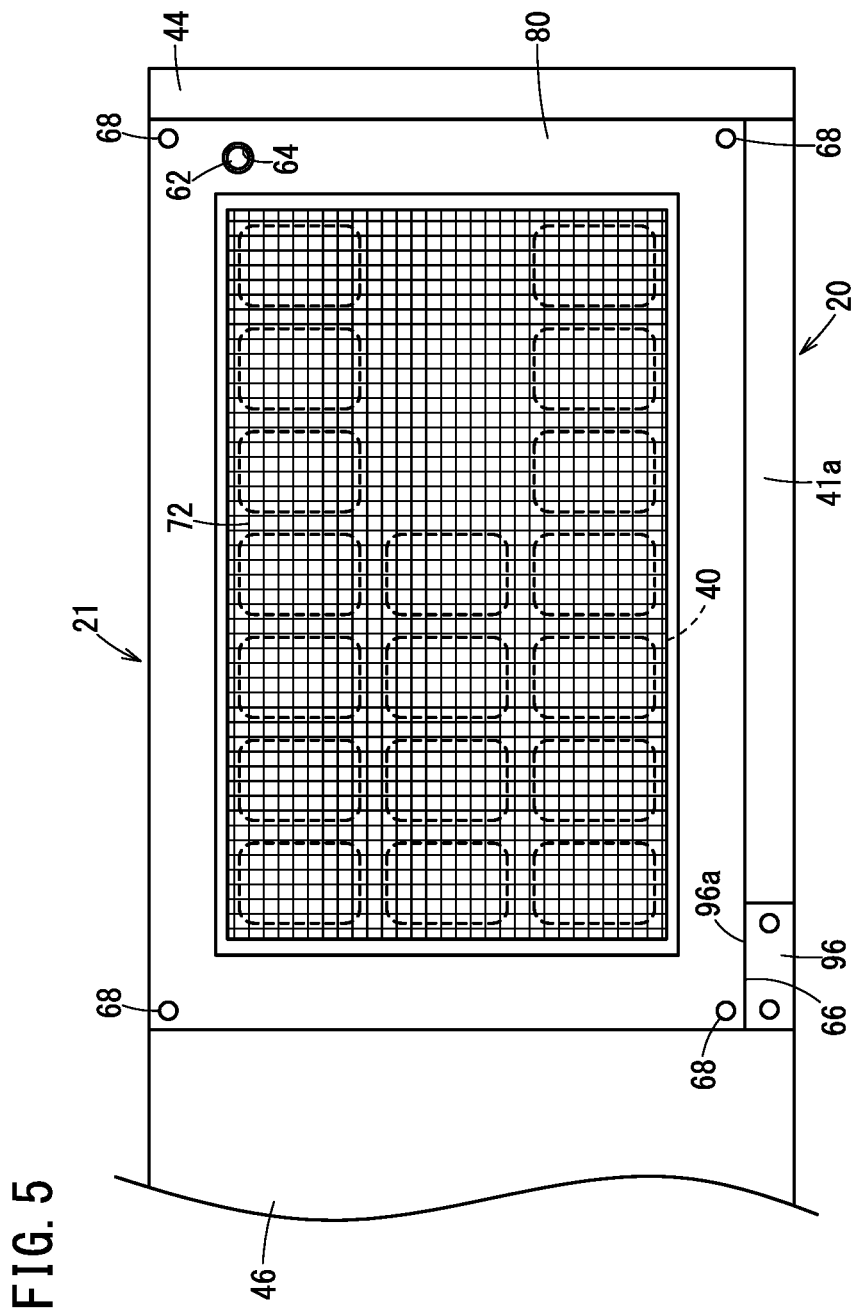

STACK CASE AND METHOD OF ASSEMBLING STACK CASE

CROSS-REFERENCE TO RELATED APPLICATIONS

This application is based upon and claims the benefit of priority from Japanese Patent Application No. 2021-041219 filed on Mar. 15, 2021, the contents of which are incorporated herein by reference.

BACKGROUND OF THE INVENTION

Field of the Invention

The present invention relates to a stack case for housing a fuel cell stack and a method of assembling the stack case.

Description of the Related Art

For example, as described in JP 2020-029190 A, it is known to mount a fuel cell stack on a vehicle or the like in a state where the fuel cell stack is housed in a stack case. The stack case includes a main body and a lid member. The main body houses the fuel cell stack therein. An opening is provided in a side portion of the main body. The lid member is attached to a position at which the lid member can close the opening of the main body. Therefore, for example, even after the fuel cell stack is housed in the stack case, maintenance or the like can be easily performed on the fuel cell stack housed in the main body through the opening by removing the lid member from the main body.

SUMMARY OF THE INVENTION

It is desirable to easily attach the lid member that is positioned with high accuracy with respect to the opening of the main body. An object of the present invention is to achieve the above-described object.

In an aspect of the present invention, there is provided a stack case including a main body housing a fuel cell stack therein and having a side portion provided with an opening, and a lid member covering the opening, wherein on an edge of the opening in the side portion, a single positioning pin is arranged at a position above a vertical center of the opening and closer to one end of the opening than a horizontal center of the opening, and a protrusion is arranged at a position below the vertical center of the opening and closer to another end than the horizontal center of the opening, the positioning pin and the protrusion protrude outward of the main body from the edge of the opening, the protrusion includes an upper positioning surface, the lid member includes an insertion hole which the positioning pin passes through and a placement surface placed on the positioning surface, the positioning pin passing through the insertion hole supports the lid member around an axis of the positioning pin, and the placement surface is placed on the positioning surface with the positioning pin inserted into the insertion hole, whereby the lid member is positioned with respect to the opening.

In another aspect of the present invention, there is provided a method of assembling a stack case by covering, with a lid member, an opening formed in a side portion of a main body housing a fuel cell stack, wherein on an edge of the opening in the side portion, a single positioning pin is arranged at a position above a vertical center of the opening and closer to one end of the opening than a horizontal center of the opening, and a protrusion is arranged at a position below the vertical center of the opening and closer to another end than the horizontal center of the opening, the positioning pin and the protrusion protrude outward of the main body from the edge of the opening, the protrusion includes an upper positioning surface, the lid member includes an insertion hole which the positioning pin passes through and a placement surface placed on the positioning surface, the method comprising: an insertion step of inserting the positioning pin through the insertion hole; and positioning step of rotating the lid member around an axis of the positioning pin having been inserted through the insertion hole, and placing the placement surface on the positioning surface, thereby positioning the lid mem with respect to the opening.

In the stack case and the method of assembling the stack case, the single positioning pin protruding from the side portion of the main body is inserted into the insertion hole of the lid member. Then, the lid member is rotated around the axis of the positioning pin. Thus, the placement surface of the lid member is placed on the positioning surface of the protrusion protruding from the side portion of the main body. With such a simple operation, the lid member can be positioned with respect to the opening with high accuracy.

In addition, as long as the positioning pin is inserted into the insertion hole and the placement surface is placed on the positioning surface, it is possible to maintain a state in which the lid member is positioned with high accuracy with respect to the opening. When the lid member is being attached to the main body, the operator has been conventionally required to perform a complicated operation such as carefully supporting the lid member with one hand in order to keep the lid member positioned with respect to the opening, while proceeding with the attachment work with the other hand. According to the present invention, such a complicated operation can be eliminated.

Therefore, according to the present invention, it is possible to easily attach the lid member positioned with high accuracy with respect to the opening of the main body.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is an explanatory diagram illustrating a positioning step.

DESCRIPTION OF THE INVENTION

In the following description, "left", "right", "front", "rear", "lower", and "upper" will be referred using a driver's seat of a vehicle as a reference point. The expression "vehicle width direction" is used for the same meaning as the expression "the left-right direction". The expression "vehicle length direction" is used for the same meaning as the expressions "the front-rear direction" and "the traveling direction". The expression "vehicle height direction" is used for the same meaning as the expressions "an up-down direction" and "the vertical direction".

Figure 1:
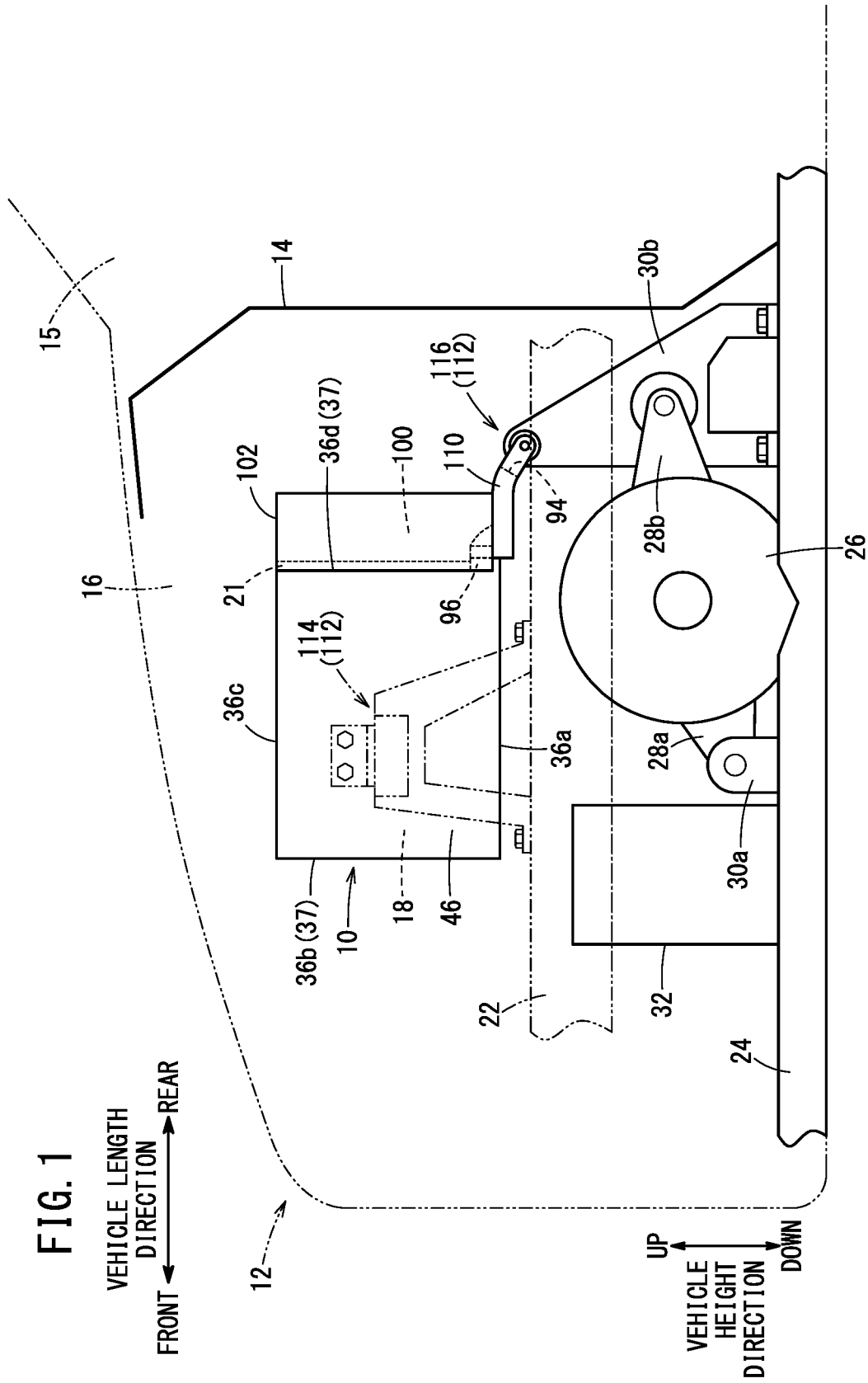
FIG. 1 is a schematic side view of a main part of a vehicle on which a stack case according to an embodiment of the present invention is mounted.

FIG. 1 is a schematic side view of a main part of a fuel cell vehicle 12 (vehicle) on which a stack case 10 according to the present embodiment is mounted. A front part of the fuel cell vehicle 12 includes a front room 16. The front room 16 is separated from a vehicle cabin 15 by a dashboard 14. The stack case 10 is disposed in the front room 16. The stack case 10 houses a fuel cell stack 18.

A side frame 22 and a cross member 24 that constitute a vehicle body frame are provided in the front room 16. The side frame 22 extends in the vehicle length direction. The cross member 24 extends in the vehicle width direction below the side frame 22.

A fuel gas is supplied to the fuel cell stack 18 from a fuel gas supply device (not shown). An oxygen-containing gas is supplied to the fuel cell stack 18 from an oxygen-containing gas supply device (not shown). The fuel cell stack 18 generates electric power by electrochemical reactions of the fuel gas and the oxygen-containing gas supplied as described above. The fuel cell stack 18 supplies electric power generated by the power generation to a travel motor 26 and a battery (not shown) provided in the front room 16.

The travel motor 26 is disposed under the stack case 10. The travel motor 26 propels the fuel cell vehicle 12 via a transmission, wheels, and the like (not shown). A front portion of the travel motor 26 is fixed to the cross member 24 via a motor bracket 28a and a front support 30a. A rear portion of the travel motor 26 is fixed to the cross member 24 via a motor bracket 28b and a rear support 30b.

A power drive unit (PDU) 32 that supplies appropriate power to the travel motor 26 is provided in front of the travel motor 26. The PDU 32 is configured as a three phase bridge inverter. The PDU 32 converts power (DC power) generated by the fuel cell stack 18 into AC power. The PDU 32 adjusts the rotational driving force of the travel motor 26 under the control of an ECU (electronic control unit) (not shown).

Figure 2:
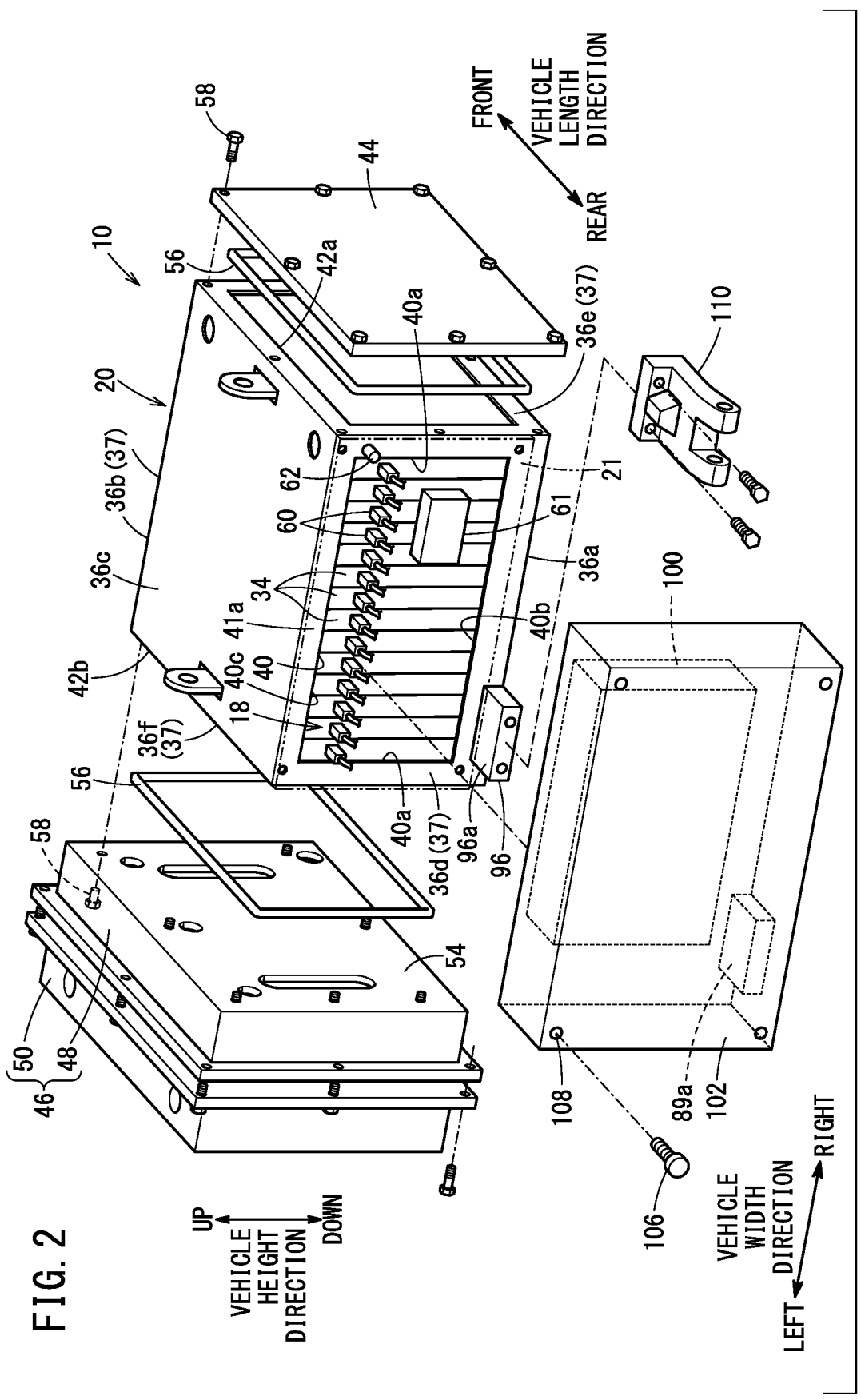
FIG. 2 is a schematic perspective view from the rear of the stack case constituting a fuel cell system.

As shown in FIG. 2, the fuel cell stack 18 includes a plurality of power generation cells 34 stacked along the vehicle width direction. The fuel cell stack 18 is housed in the stack case 10 in this state. At this time, the electrodes of the power generation cell 34 are in a standing posture.

The stack case 10 includes a main body 20, a lid member 21, and a voltage control unit case 102. The main body 20 has a bottom wall 36a, an upper wall 36c, and a side portion 37. The side portion 37 includes a front side portion 36b, a rear side portion 36d, a right side portion 36e, and a left side portion 36f. The rear side portion 36d is provided with an opening 40 and an edge 41a surrounding the opening 40. The opening 40 has a rectangular shape defined by a pair of vertically extending side edges 40a, a horizontally extending lower edge 40b, and a horizontally extending upper edge 40c. Joints between the side edges 40a and the lower edge 40b and between the side edges 40a and the upper edge 40c may be curved (circular arc shaped). The edge 41a is provided with a single positioning pin 62 at a position above the vertical center of the opening 40 and closer to the right end (one end portion) than the center in the left-right direction (horizontal direction). The positioning pin 62 is inserted into an insertion hole formed in the edge 41a. In addition, on the edge 41a, a protrusion 96 is provided at a position below the vertical center of the opening 40 and closer to the left end portion (the other end portion) than the center in the left-right direction (the horizontal direction) of the opening 40.

The positioning pin 62 and the protrusion 96 protrude outward (rearward) from the edge 41a of the main body 20.

The upper surface of the protrusion 96 serves as a flat positioning surface 96a. As will be described later, a mount bracket 110 is bolted to the rear side surface of the protrusion 96. The protrusion 96 is formed integrally with the edge 41a.

The right side portion 36e of the main body 20 is provided with a right opening 42a and an edge defining the periphery of the right opening 42a. The left side portion 36f is provided with a left opening 42b and an edge defining the periphery of the left opening 42b.

At the right end of the power generation cells 34 in the stacking direction (vehicle width direction), a first terminal plate and a first insulating plate (not shown) are disposed outward in this order, and housed in the main body 20. A first end plate 44 is attached to the edge of the right side portion 36e of the main body 20. The first end plate 44 closes the right opening 42a of the stack case 10. The first end plate 44 applies a tightening load to the stacked body of the power generation cells 34 in the stacking direction.

Similarly, at the left end of the power generation cells 34 in the stacking direction, a second terminal plate and a second insulating plate (not shown) are disposed outward in this order. The second terminal plate and the second insulating plate are housed in the main body 20. An auxiliary device case 46 is attached to the edge of the left side portion 36f of the main body 20.

The auxiliary device case 46 includes a recessed first case member 48 and a recessed second case member 50 to be joined to the first case member 48. The auxiliary devices such as pipes, an injector, a hydrogen pump, valves, and other auxiliary devices for the hydrogen system are housed inside these case members. The auxiliary devices for the hydrogen system is a hydrogen gas supply device of the fuel cell system.

The first case member 48 has a wall portion 54 that closes the left opening 42b of the main body 20. The wall portion 54 functions as a second end plate that applies the tightening load to the stacked body of the power generation cells 34 in the stacking direction. The first end plate 44 is attached to the main body 20 by connecting bolts 58. A seal member 56 is disposed between the first end plate 44 and the main body 20. The wall portion 54 is attached to the main body 20 by connecting bolts 58. A seal member 56 is disposed between the wall portion 54 and the main body 20.

An anode of the power generation cell 34 disposed at the one end of the cell stack body of the power generation cells 34 stacked in the stacking direction is electrically connected to the first terminal plate. A cathode of the power generation cell 34 disposed at the other end of the cell stack body in the stacking direction is electrically connected to the second terminal plate. Further, a part of each of the terminal plates protrudes outward from openings in the upper wall 36c of the stack case 10. The protruded parts of the both terminal plates are electrically connected to the VCU (Voltage Control Unit) 100 via a contactor (not shown). A cell voltage terminal (cell voltage detection terminal) 60 is electrically connected to each of the power generation cells 34. Although not particularly illustrated, a connection point is provided at an outer peripheral edge of a separator of each power generation cell 34. The cell voltage terminal 60 is electrically connected to the connection point.

The plurality of cell voltage terminals 60 are detachably provided to the fuel cell stack 18 at its rear portion facing the opening 40. The cell voltage terminals 60 are exposed to the outside of the main body 20 through the opening 40. Although not illustrated, a harness extends from a rear portion of the cell voltage terminal 60. The harness transmits the detected cell voltage to the cell voltage control unit 61.

The cell voltage control unit 61 collects the voltages detected at the cell voltage terminals 60, processes them internally in a collective manner, and then sends them to the control system of the fuel cell stack 18.

Figure 3:
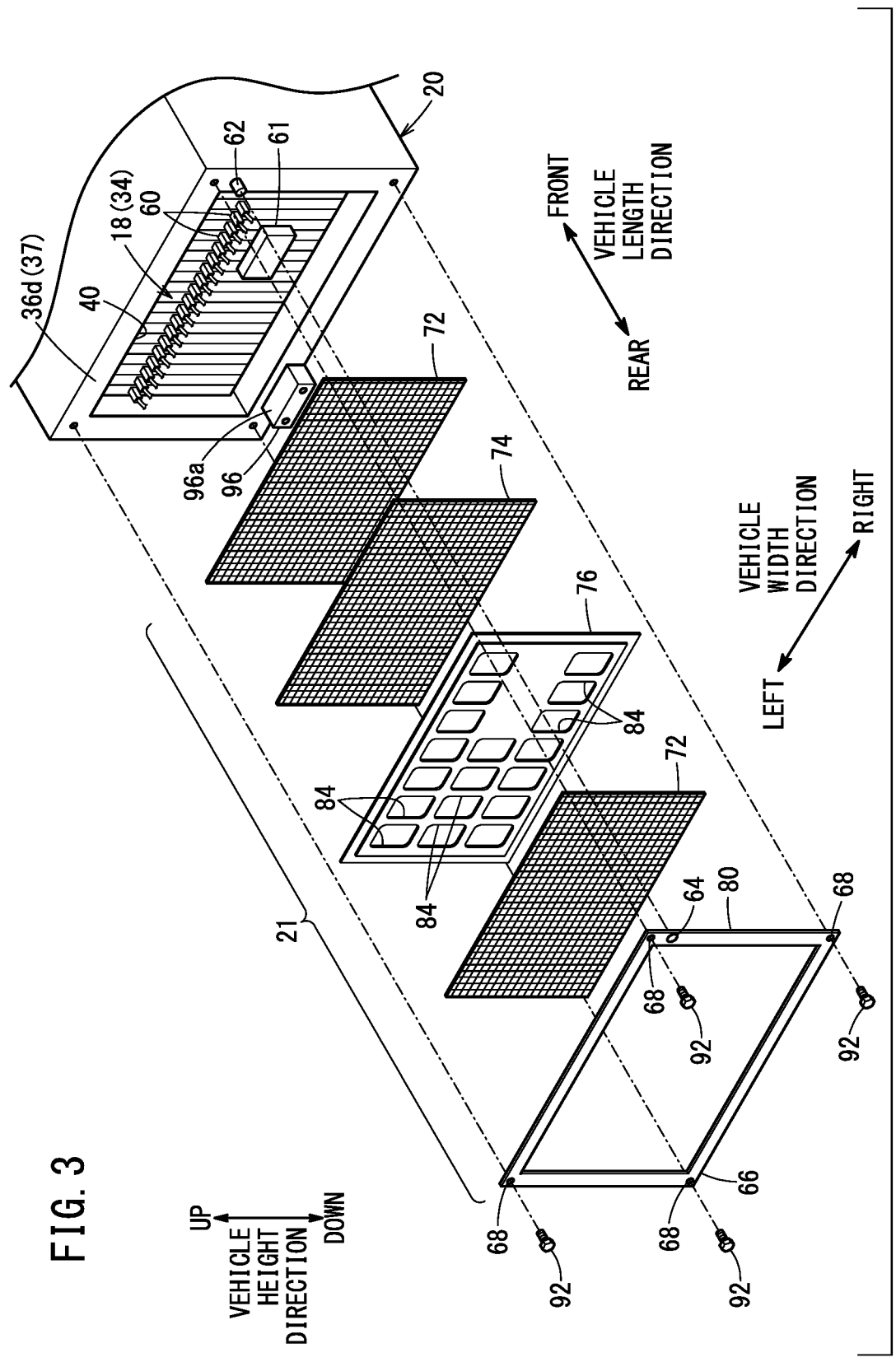
FIG. 3 is an exploded perspective view of a lid member.

As shown in detail in FIGS. 3 and 5, the lid member 21 covers the cell voltage terminals 60 by covering the opening 40. In FIG. 3, the right opening 42a and the first end plate 44 on the right side of the main body 20 and the auxiliary device case 46 on the left side of the main body 20 are not shown. In the present embodiment, the lid member 21 is a laminated filter in which a filter member 74 and a set of mesh members 72 are laminated. The set of mesh members 72 sandwich and hold the filter member 74. The mesh member 72, the filter member 74, the frame-shaped holder 76, the mesh member 72, and the seal plate 80 are arranged in this order in a direction away from the main body 20 and integrated to form the lid member 21.

The mesh member 72 is formed of a knitted plate member in which relatively large meshes are formed in a lattice shape or a circular shape. On the other hand, the filter member 74 is a plate member in which fine through holes that are finer than the meshes in the mesh member 72 are formed. Therefore, foreign matters that have not been trapped by the mesh member 72 are trapped by the filter member 74. The filter member 74 can also be protected by being sandwiched by the set of mesh members 72. A plurality of vent holes 84 are formed in the frame-shaped holder 76 by cutting out portions of the frame-shaped holder 76 in a grid pattern.

For example, each of the mesh members 72 and the frame-shaped holder 76 can be made of a fiber-reinforced resin material in which glass fibers are impregnated with resin. Further, for example, each of the mesh members 72 and the seal plate 80 can be made of metal such as an aluminum alloy.

Figure 4:
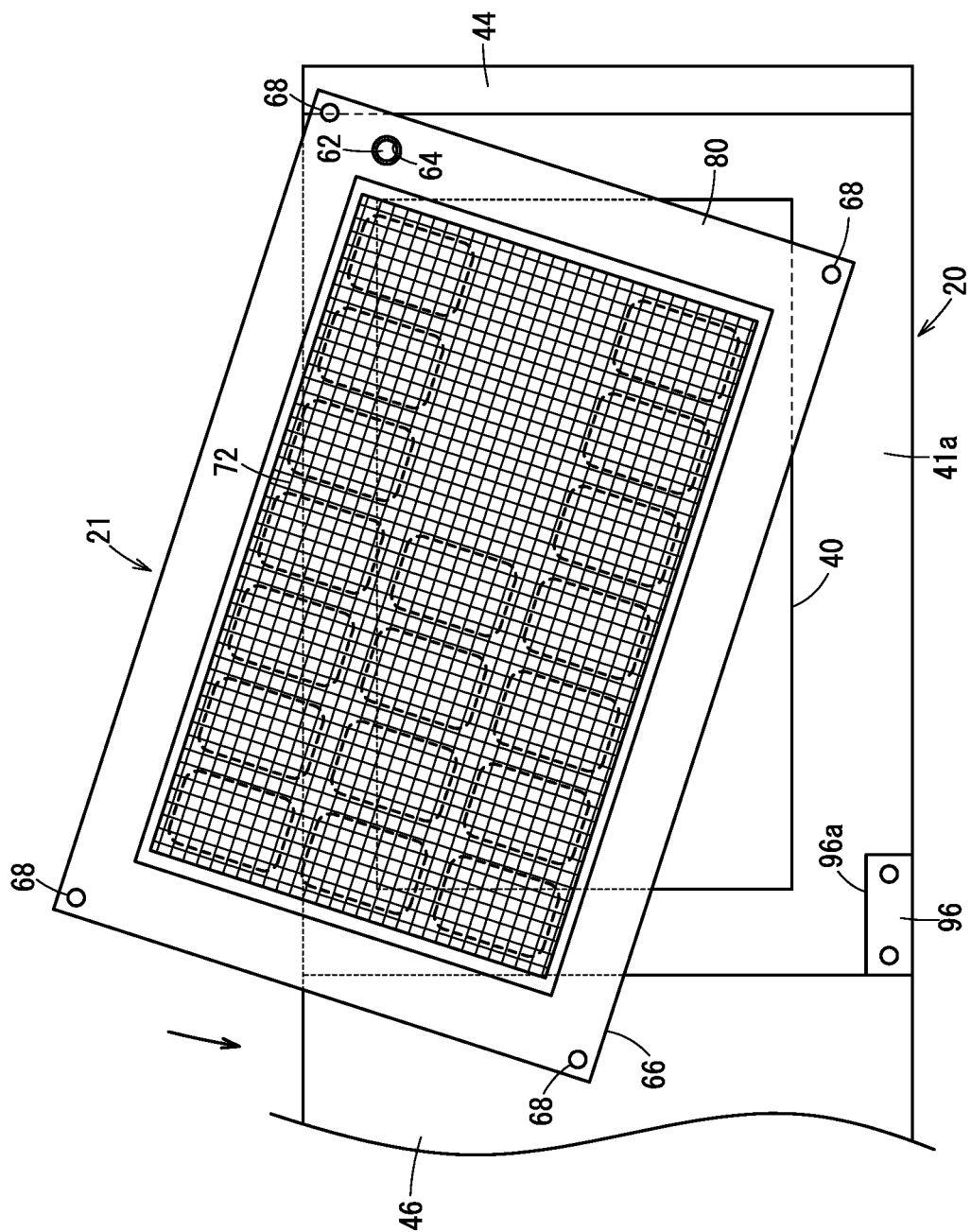
FIG. 4 is an explanatory diagram illustrating an insertion step.

The insertion hole 64, the placement surface 66, and bolt holes 68 are formed in the seal plate 80 of the lid member 21. The positioning pin 62 is inserted into the insertion hole 64. The placement surface 66 is placed on the positioning surface 96a. Fixing bolts 92 are inserted through the bolt holes 68. The insertion hole 64 is provided at a position where the insertion hole 64 is capable of receiving the positioning pin 62 when the opening 40 is closed by the lid member 21. That is, the insertion hole 64 is provided as a single hole in the upper right end portion of the lid member 21. The diameter of the insertion hole 64 is set to be slightly larger than the diameter of the positioning pin 62. That is, there is a gap between the inner surface of the insertion hole 64 and the outer surface of the positioning pin 62. Thus, as shown in FIGS. 4 and 5, the positioning pin 62 inserted into the insertion hole 64 supports the lid member 21. The lid member 21 is supported by the positioning pin 62 so as to be rotatable about the axis of the positioning pin 62.

The placement surface 66 is a flat surface that is placed on the positioning surface 96a of the protrusion 96 when the opening 40 is closed by the lid member 21. That is, the placement surface 66 is provided at a lower left end portion of the lid member 21. As shown in FIG. 5, the placement surface 66 is placed on the positioning surface 96a in a state where the lid member 21 is supported by the positioning pin 62 via the insertion hole 64. Thus, the lid member 21 is positioned with respect to the opening 40. With respect to the opening 40, the placement surface 66 and the positioning pin 62 are provided at diagonal positions.

In a state in which the lid member 21 is positioned with respect to the opening 40 as described above, the fixing bolts 92 inserted through the bolt holes 68 are screwed to the edge 41a. As a result, the lid member 21 is fixed to the main body 20.

As shown in FIG. 2, a rear portion of the lid member 21 fixed to the main body 20 is covered with the VCU case 102. The VCU case 102 houses a VCU 100 that is an electrical device. A space 89a capable of accommodating a part of the mount bracket 110 and the protrusion 96 is formed in a lower portion of the VCU case 102.

The VCU case 102 is provided with through-holes 108 penetrating the VCU case 102 in the front-rear direction. Mounting bolts 106 are inserted through the through-holes 108. The distal ends of the mounting bolts 106 inserted through the through-holes 108 are screwed into screw holes (not illustrated) provided on the edge 41a of the opening 40. Thus, the VCU case 102 is coupled to the main body 20.

As shown in FIG. 1, the stack case 10 is integrated with the auxiliary device case 46. In this state, the stack case 10 is held at a predetermined position of the fuel cell vehicle 12 by the plurality of mounts 112. In the present embodiment, the predetermined position where the stack case 10 is held is above the travel motor 26 in the front room 16. Further, in the present embodiment, the plurality of mounts 112 refer to a set of side mounts 114 and a rear mount 116. When the set of the side mounts 114 and the rear mount 116 are not particularly distinguished from each other, they are collectively referred to as the mount 112.

The set of side mounts 114 are disposed so as to sandwich the stack case 10 and the auxiliary device case 46 in the vehicle width direction. The left side mounts 114 fix the left end of the second case member 50 to the side frame 22. Although not shown in FIG. 1, the right side mount 114 fixes the first end plate 44 to the side frame 22.

The rear mount 116 is disposed rearward of the stack case 10. The rear mount 116 fixes the main body 20 to the cross member 24. The rear mount 116 includes a rear support 30b and the mount bracket 110. The rear support 30b fixes the rear portion of the travel motor 26 to the cross member 24 as described above. The mount bracket 110 is directly attached to the protrusion 96 of the main body 20.

The rear support 30b rotatably supports the mount bracket 110. The rear support 30b elastically supports the rear portion of the travel motor 26 via the motor bracket 28b. The rear support 30b extends upward from the cross member 24 above the travel motor 26. One end portion of a mount bracket 110 is connected to an upper portion of the rear support 30b extending in this manner via a fastening pin. As described above, the other end portion of the mount bracket 110 is fixed to the rear side surface of the protrusion 96 by a bolt. That is, the main body 20 is fixed to the cross member 24 via the mount bracket 110 and the rear support 30b.

A lower surface of the VCU 100 is in contact with an upper surface of the mount bracket 110. Thus, the VCU 100 is supported by the mount bracket 110. The mount bracket 110 is provided with a fragile portion 94. The stack case 10 may take an impact when the fuel cell vehicle 12 collides with an external object, for example. When the stack case 10 takes an impact, the fragile portion 94 is easily broken. The fragile portion 94 has a structure formed to be thinner than other portions of the mount bracket 110, for example. When an impact is applied to the stack case 10, the fragile portion 94 is broken before any other portions (including the stack case 10) of the mount bracket 110 are broken.

The stack case 10 according to the present embodiment is basically configured as described above. Hereinafter, a method of assembling the stack case 10 according to the present embodiment will be described. In this assembling method, the opening 40 of the main body 20 is covered with the lid member 21 to assemble the stack case 10. In the present embodiment, the lid member 21 is attached to the main body 20 after the first end plate 44 and the auxiliary device case 46 (the first case member 48) are attached to the main body 20. However, the lid member 21 may be attached to the main body 20 before the first end plate 44 and the auxiliary device case 46 (the first case member 48) are attached to the main body 20.

As shown in FIG. 4, an insertion step of inserting the positioning pin 62 protruding from the edge 41a of the opening 40 into the insertion hole 64 of the lid member 21 is performed. Next, a positioning step is performed. In the positioning step, as shown in FIGS. 4 and 5, the lid member 21 is rotated around the axis of the positioning pin 62 inserted into the insertion hole 64. Thus, the placement surface 66 is placed on the positioning surface 96a. Thus, the lid member 21 is positioned with respect to the opening 40. Next, the positioning pin 62 is inserted into the insertion hole 64 as described above, and the fixing bolts 92 are inserted into the bolt holes 68 in a state in which the placement surface 66 is placed on the positioning surface 96a. The fixing bolts 92 are screwed into the edge 41a. As a result, the lid member 21 positioned with respect to the opening 40 is fixed to the main body 20. As a result, the stack case 10 is assembled.

As described above, in the stack case 10 and the method of assembling the stack case 10 according to the present embodiment, a single positioning pin 62 protruding from the side portion 37 (rear side portion 36d) of the main body 20 is inserted into the insertion hole 64 of the lid member 21. Then, the lid member 21 is rotated around the axis of the positioning pin 62, and the placement surface 66 of the lid member 21 is placed on the positioning surface 96a of the protrusion 96 protruding from the side portion 37 of the main body 20. By such a simple operation, the lid member 21 can be positioned with respect to the opening 40 with high accuracy.

In addition, when the positioning pin 62 is inserted into the insertion hole 64 and the placement surface 66 is placed on the positioning surface 96a, it is possible to maintain a state in which the lid member 21 is positioned with high accuracy with respect to the opening 40. When the lid member 21 is being attached to the main body 20, the operation is complicated if the operator is required to perform, for example, carefully supporting the lid member 21 with one hand in order to keep the lid member 21 positioned with respect to the opening 40, while proceeding with the attachment work with the other hand. According to the present embodiment, such a complicated operation can be eliminated.

Further, in the stack case 10 and the method of assembling the stack case 10 according to the present embodiment, for example, a plurality of positioning pins (not shown) and a plurality of insertion holes corresponding to the positioning pins can be eliminated from the stack case 10. Even in this case, it is possible to maintain the lid member 21 in a state where the lid member 21 is positioned with respect to the opening 40. Therefore, a complicated process of forming the plurality of positioning pins and the plurality of insertion holes with high accuracy so as to correspond to each other is not necessary. In addition, when a plurality of configurations protruding from the edge 41a of the opening 40, such as a plurality of positioning pins, are provided, there is a concern that workability of operation, for example, attaching the VCU case 102 to the main body 20 may be reduced. Further, when a plurality of configurations protruding from the edge 41a of the opening 40, such as a plurality of positioning pins, are provided, there is a concern that workability of operation, for example, arranging various wirings of the harness may be lowered. On the other hand, in the stack case 10 and the method of assembling the stack case 10 according to the present embodiment, only one positioning pin 62 needs to be provided on the edge 41a of the opening 40. Therefore, it is possible to suppress the workability from lowering.

Therefore, according to the stack case 10 and the method of assembling the stack case 10 according to this embodiment, the lid member 21 positioned with high accuracy with respect to the opening 40 of the main body 20 can be easily attached.

The stack case 10 according to the above-described embodiment is held at a predetermined position in the vehicle (fuel cell vehicle 12) by the plurality of mounts 112 fixed to the vehicle body frame (side frame 22, cross member 24) of the vehicle (fuel cell vehicle 12). At least one of the plurality of mounts 112 (rear mount 116) has a mount bracket 110 connected to the vehicle body frame (side frame 22, cross member 24). A mount bracket 110 is attached to a portion (rear side surface) of the protrusion 96 other than the positioning surface 96a of the protrusion 96.

According to this configuration, the protrusion 96 for attaching the mount bracket 110 to the main body 20 can be used as a configuration for positioning the lid member 21 with respect to the opening 40. For this reason, it is not necessary to newly provide a configuration dedicated to positioning of the lid member 21 in the main body 20. This makes it possible to further simplify the configuration of the stack case 10.

However, the protrusion 96 may be provided separately from the configuration for attaching the mount bracket 110. Further, the fuel cell system including the stack case 10 may not include the mount bracket 110.

In the stack case 10 according to the above-described embodiment, the opening 40 exposes, from the main body 20, the cell voltage detection terminal (cell voltage terminal 60) electrically connected to the electrode of the fuel cell stack 18. The lid member 21 covers the opening 40, thereby covering the cell voltage detection terminal (cell voltage terminal 60). According to this configuration, for example, first, the operator loosens the mounting bolts 106 and removes the VCU case 102 from the stack case 10. Next, the operator loosens the fixing bolts 92 to detach the lid member 21 from the stack case 10. As a result, for example, the cell voltage terminals 60 can be exposed to the outside of the stack case 10. Therefore, for example, maintenance can be easily performed on the cell voltage terminals 60. After the maintenance is completed, as described above, it is possible to easily attach the lid member 21 positioned with high accuracy with respect to the opening 40.

The lid member 21 is not limited to cover the opening 40 through which the cell voltage terminals 60 are exposed. The lid member 21 may cover an opening provided in at least one of the left side portion 36f, the right side portion 36e, and the front side portion 36b of the main body 20. That is, in the above-described embodiment, the first end plate 44 is attached to the edge of the right side portion 36e of the main body 20. The auxiliary device case 46 is attached to the edge of the left side portion 36f of the main body 20. However, the configuration of the stack case 10 is not limited to those described above.

Although not illustrated, an opening such as a small window may be provided in the right side portion 36e. The positioning pin 62 and the protrusion 96 may be provided on the edge of the opening. In this case, the opening on the right side portion 36e is covered with the lid member 21 instead of the first end plate 44. Further, although not shown, an opening such as a small window may be provided in the left side portion 36f. The positioning pin 62 and the protrusion 96 may be provided on the edge of the opening. In this case, the opening on the left side portion 36f may be covered with the lid member 21 instead of the auxiliary device case 46. Even in these cases, similarly to the case where the opening 40 exposing the cell voltage terminals 60 is covered with the lid member 21, the lid member 21 positioned with high accuracy with respect to the opening of the main body 20 can be easily attached.

In the stack case 10 according to the above-described embodiment, the lid member 21 is a laminated filter obtained by laminating the filter member 74 and the mesh member 72 holding the filter member 74. According to this configuration, for example, part of the traveling wind generated during traveling of the fuel cell vehicle 12 can be taken into the main body 20 via the lid member 21 serving as the laminated filter. Therefore, for example, it is possible to cool the fuel cell stack 18 and to ventilate the inside of the stack case 10. The lid member 21 prevents foreign substances such as pebbles, sand grains, and dust from entering the main body 20 through the opening 40.

Further, in the lid member 21, the filter member 74 can be protected by being held by the mesh members 72. Note that the lid member 21 is not limited to being a laminated filter. The lid member 21 may be, for example, a simple cover formed of a member having no air permeability.

The present invention is not limited to the embodiments described above, and various configurations can be adopted without departing from the gist of the present invention.

For example, in the above-described embodiment, the lid member 21 is attached to the main body 20 by the fixing bolts 92. In addition, the VCU case 102 is attached to the main body 20 by mounting bolts 106. However, the bolts for attaching the lid member 21 to the main body 20 may also be used for connecting the VCU case 102 to the main body 20.

What is claimed is:

1. A stack case comprising: a main body housing a fuel cell stack therein and having a side portion with an opening; and a lid member covering the opening, wherein
on an edge of the opening in the side portion, a single positioning pin is arranged at a position above a vertical center of the opening and closer to one end of the opening than a horizontal center of the opening, and a protrusion is arranged at a position below the vertical center of the opening and closer to another end of the opening than the horizontal center of the opening,
the positioning pin and the protrusion protrude outward of the main body from the edge of the opening,
the protrusion includes an upper positioning surface,
the lid member includes an insertion hole which the positioning pin passes through and a placement surface placed on the upper positioning surface,
the positioning pin passing through the insertion hole supports the lid member rotatably around an axis of the positioning pin, and
the placement surface is placed on the upper positioning surface with the positioning pin inserted into the insertion hole, whereby the lid member is positioned with respect to the opening, and
with the positioning pin inserted into the insertion hole of the lid member and the placement surface placed on the positioning surface, the lid member is configured to be rotated around an axis of the positioning pin, whereby the lid member is positioned with respect to the opening.

2. The stack case according to claim 1, wherein
the stack case is held at a predetermined position in a vehicle by a plurality of mounts fixed to a vehicle body frame of the vehicle, and
at least one of the plurality of mounts has a mount bracket connected to the vehicle body frame, and
wherein the mount bracket is attached to a portion of the protrusion other than the upper positioning surface of the protrusion.

3. The stack case according to claim 1, wherein
a cell voltage detection terminal is electrically connected to electrodes of the fuel cell stack and exposed from the main body through the opening, and
the lid member covering the opening covers the cell voltage detection terminal.

4. The stack case according to claim 1, wherein
the lid member is a laminated filter in which a filter member and a mesh member holding the filter member are laminated.

5. A method of assembling a stack case by covering, with a lid member, an opening formed in a side portion of a main body housing a fuel cell stack, wherein
on an edge of the opening in the side portion, a single positioning pin is arranged at a position above a vertical center of the opening and closer to one end of the opening than a horizontal center of the opening, and a protrusion is arranged at a position below the vertical center of the opening and closer to another end than the horizontal center of the opening,
the positioning pin and the protrusion protrude outward of the main body from the edge of the opening,
the protrusion includes an upper positioning surface,
the lid member includes an insertion hole which the positioning pin passes through and a placement surface to be placed on the upper positioning surface, and
with the positioning pin inserted into the insertion hole of the lid member and the placement surface placed on the positioning surface, the lid member is configured to be rotated around an axis of the positioning pin, whereby the lid member is positioned with respect to the opening,
the method comprising:
an insertion step of inserting the positioning pin through the insertion hole; and
a positioning step of rotating the lid member around an axis of the positioning pin having been inserted through the insertion hole, and placing the placement surface on the upper positioning surface, thereby positioning the lid member with respect to the opening.

* * * * *